(12) United States Patent
Pols Sandhu et al.

(10) Patent No.: US 6,925,843 B1
(45) Date of Patent: Aug. 9, 2005

(54) RACK SECURITY MECHANISM

(75) Inventors: Yvetta D. Pols Sandhu, Winchester, MA (US); Jonathan A. Colprit, Charlestown, MA (US); Robert S. Antonuccio, Burlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 270 days.

(21) Appl. No.: 09/708,822

(22) Filed: Nov. 8, 2000

(51) Int. Cl.⁷ ............................................. E05B 65/46
(52) U.S. Cl. ...................... 70/86; 70/DIG. 57; 70/232; 70/160; 361/726
(58) Field of Search ........................... 70/86, DIG. 57, 70/232, 158–163, 166–169; 211/26; 361/724–727; 312/333

(56) References Cited

U.S. PATENT DOCUMENTS

| | | | | |
|---|---|---|---|---|
| 423,309 A | * | 3/1890 | Chamberlain | 310/246 |
| 2,171,664 A | * | 9/1939 | McFarland | 248/154 |
| 2,819,692 A | * | 1/1958 | Johnson et al. | 109/50 |
| 3,538,724 A | * | 11/1970 | Dauenbaugh | 70/86 |
| 3,564,879 A | * | 2/1971 | Bennett | 70/232 |
| 3,592,521 A | * | 7/1971 | Cox | 312/333 |
| 3,910,079 A | * | 10/1975 | Gassaway | 70/58 |
| 4,401,247 A | * | 8/1983 | Zoor | 224/315 |
| 4,898,009 A | * | 2/1990 | Lakoski et al. | 70/58 |
| 5,410,897 A | * | 5/1995 | Edmondson | 70/226 |
| 5,683,122 A | * | 11/1997 | Lee | 292/39 |
| 5,691,879 A | * | 11/1997 | Lopez et al. | 361/685 |
| 5,865,043 A | * | 2/1999 | Loughlin | 70/20 |
| 5,986,881 A | * | 11/1999 | Yang | 361/685 |
| 6,123,203 A | * | 9/2000 | Gibbons | 211/26 |
| 6,181,549 B1 | * | 1/2001 | Mills et al. | 361/683 |
| 6,193,339 B1 | * | 2/2001 | Behl et al. | 312/223.2 |
| 6,295,204 B1 | * | 9/2001 | Gibbons et al. | 361/726 |
| 6,557,385 B1 | * | 5/2003 | Shih | 70/161 |
| 6,702,124 B2 | * | 3/2004 | Lauchner et al. | 211/26 |
| 6,763,691 B1 | * | 7/2004 | Rafferty | 70/164 |
| 2003/0160010 A1 | * | 8/2003 | Robertson | 211/26 |
| 2003/0223192 A1 | * | 12/2003 | Searby et al. | 361/683 |

* cited by examiner

Primary Examiner—John B. Walsh
(74) Attorney, Agent, or Firm—Lahive & Cockfield, LLP

(57) ABSTRACT

A method and apparatus for securing a tray within a computer component rack is disclosed. The tray slidably mounted within the component rack. The tray is anchored to the component rack when in a closed position by at least one fastener. A cover is mounted a front face of the tray. The cover includes within its structure a locking mechanism, which prevents access through an access port to the at least one fastener while in a locked position, and allows access through the access port to the at least one fastener while in an unlocked position.

31 Claims, 8 Drawing Sheets

RACK SECURITY MECHANISM

FIELD OF THE INVENTION

The invention relates to a computer component rack and more particularly to a system for locking an individual tray mounted within a computer component rack.

BACKGROUND OF THE INVENTION

Where there is a demand for multiple computer components in compact areas, component racks are often provided for slidably mounting components. Each component typically is attached to a tray, and the tray is positioned in the rack where it is able to captively slide. If a user needs to gain access to a particular component, the tray is slid out of the component rack, providing the desired access. Once the user is finished with the component, the tray is slid back into the component rack. Often threaded fasteners (such as, e.g., screws) secure the tray to the rack in a closed position. However, this approach poses a security risk as any party with a screwdriver can open the rack tray by unscrewing the fasteners and pulling out the tray. Once the tray is pulled out, the party has full access to the component stored in the tray, and the party may remove such components at will. For the foregoing reasons, there is a need for an apparatus and system for better securing the tray in the closed position within the component rack.

SUMMARY OF THE INVENTION

The following briefly describes some embodiments of the present invention. A locking cover is provided for a component rack. At least one lock mechanism is mounted within the cover. There is also a track for supporting a sliding security plate. The lock mechanism couples with the sliding security plate, such that when activated, the lock mechanism extends the sliding security plate laterally from an end of the cover to block an access aperture, and thus access to one or more fasteners holding the tray in place.

Embodiments of the locking cover in example applications include the use of the cover in the following scenarios as an element of a locking system for a component rack. The rack has within it a slidably mounted tray. The tray anchors to the component rack in a closed position with at least one fastener. In general, removal of the tray typically requires access to and removal of at least one fastener. A cover mounts to the tray. The cover includes within its structure a locking mechanism. The general functional requirement of the locking mechanism is that it prevents access through an access port to at least one fastener while in a locked position, and allows access through the access port to the at least one fastener while in an unlocked position.

According to one aspect of the invention, the fastener is a threaded fastener, such as a screw or bolt.

According to one aspect of the invention, the locking mechanism is a key lock. The internal workings of the key lock include a pawl, a track, and a sliding security plate, such that when the key lock rotates toward a locked position, the pawl slides the security plate along the track. This action covers the at least one fastener anchoring the tray.

In two further embodiments of the invention, the locking mechanism is either a combination lock, or a padlock.

The position of the actual locking mechanism can vary. The locking mechanism can reside at one end of the cover, proximal to the at least one fastener. Alternatively, the locking mechanism can reside distal from the at least one fastener, in which case the sliding security plate extends to cover the fastener or fasteners.

According to another aspect of the invention, the tray anchors to the component rack with two threaded fasteners proximal to a first end of the cover. The tray could additionally be anchored to the component rack with at least one threaded fastener proximal to a second end of the cover, if desired.

In one embodiment of the invention, the cover forms a handle for pulling and pushing the tray in and out of the component rack. Both the cover and the security plate could be made of any number of materials including plastic and metal.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
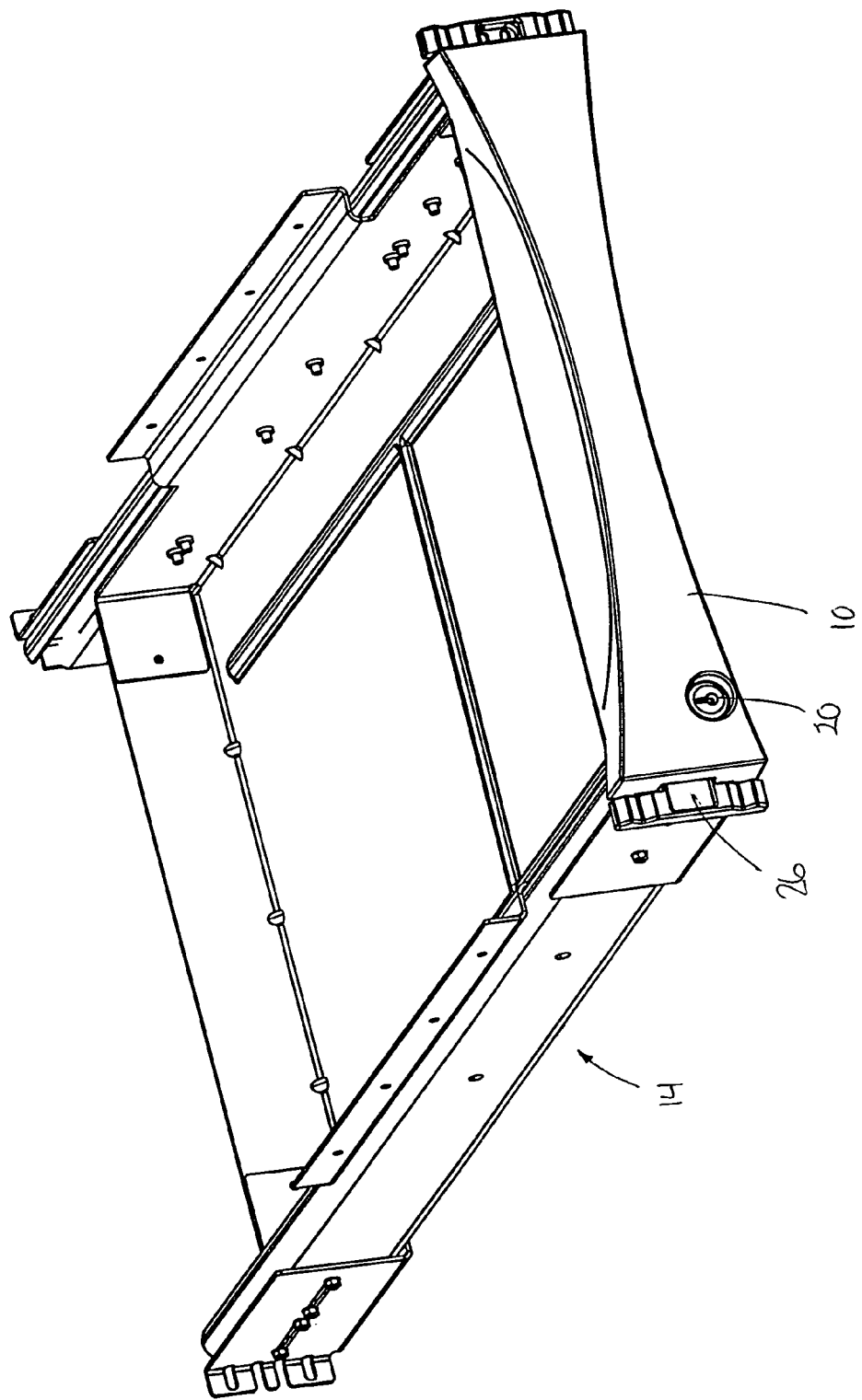
FIG. 1 is a perspective view of a tray and lockable cover according to one embodiment of the present invention.

The present invention includes a cover 10 for a tray 14 of a computer component rack 12. The cover 10 mounts to a front facing side of the tray 14, which slides in and out of the component rack 12. The structure of the cover 10 lends itself to being used as a handle for moving the tray 14. The trays 14 are often removably fastened to the component racks 12 in closed positions by threaded fasteners 28. An added feature of the cover 10 is that it includes a locking mechanism 16, which inhibits access to the threaded fasteners 28 when in a locked position.

Referring now in detail to the drawings wherein like parts are designated by like reference numerals throughout, FIGS. 1–8 illustrate example embodiments of a locking system for a component rack according to the present invention. Although the present invention will be described with reference to the example embodiments illustrated in the figures it should be understood that the present invention can be embodied in many alternative forms of embodiment. In addition, any suitable size, shape, or type of elements or materials could be utilized.

Figure 2:
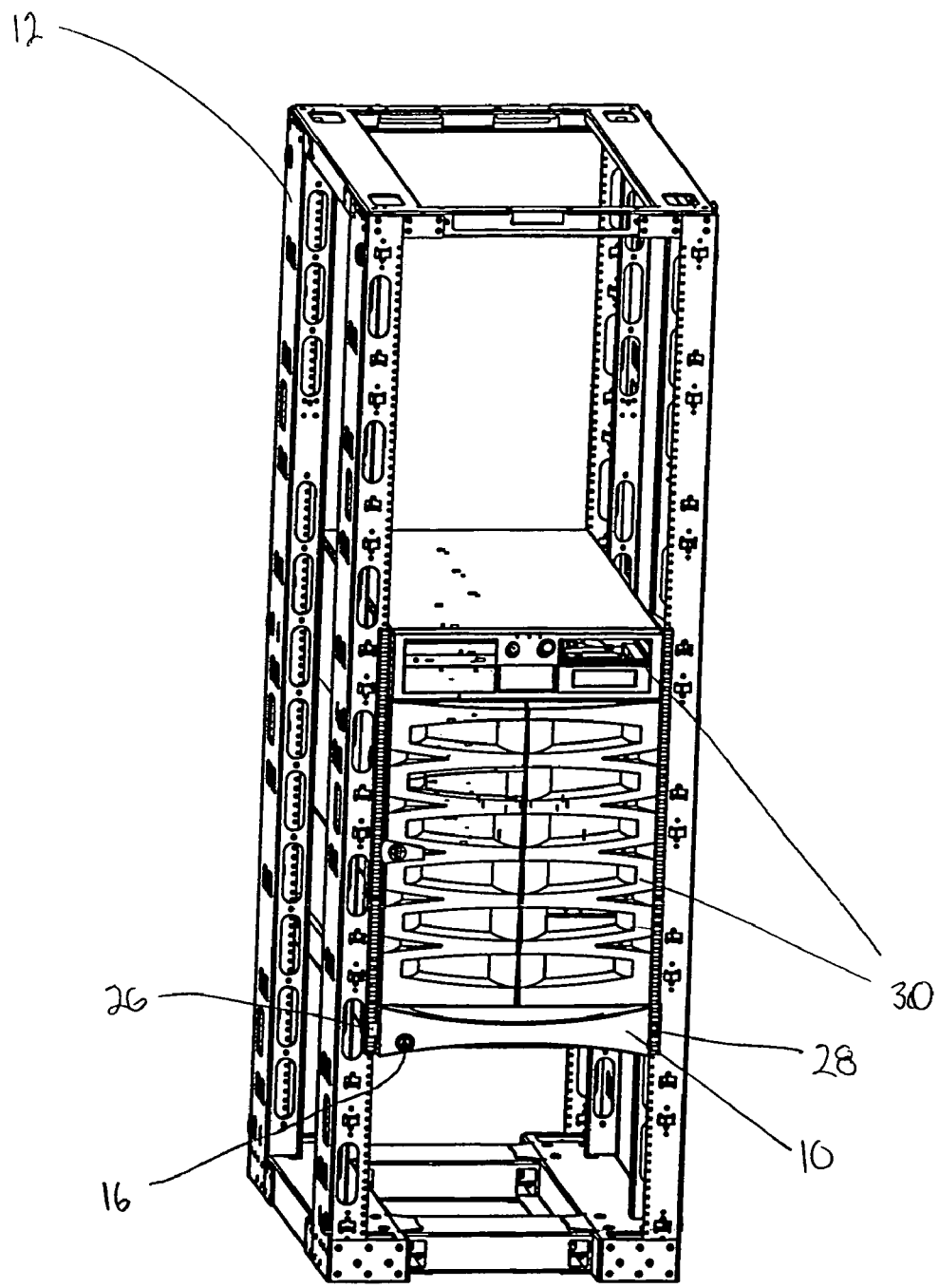
FIG. 2 is a perspective view of a single rack containing multiple components and a single cover according one embodiment of the present invention.

According to one embodiment of the present invention, FIG. 1 shows the tray 14 for holding one or more components 30. The tray 14 is made of a suitable material, such as, e.g., steel or plastic. The tray 14 is sized and shaped to hold components manufactured by, e.g., Sun Microsystems, Inc., and fit within a component rack 12 (FIG. 2). A cover 10 mounts along a front facing portion of the tray 14. As illustrated, the cover 10 extends the length of the tray 14 face. However, the cover 10 need not extend in this manner. The cover 10 can mount to merely a portion of the face of the tray 14, thus being shorter in length.

A key lock 20, for securely locking the tray 14, resides within the cover 10. There is an access port 18 at one end of the cover 10. The access port 18 provides access to a threaded fastener or fasteners 28, which removably fasten the tray 14 in a closed position. Through internal workings of the key lock 20, as discussed at a later point herein, when a user inserts a key (not shown) into the key lock 20 and rotates the key, a sliding security plate 26 moves in a lateral direction between a locked position and an unlocked position. In the locked position, the sliding security plate 26 substantially covers access port 18 (FIG. 2) and threaded fastener 28. As a result, the threaded fastener 28 is no longer accessible via that access port 18. The security plate 26 is shown as a solid metal plate. However, it may be of a porous nature, meshed, grided, perforated, or other configuration, so long as it maintains the required strength and rigidity to serve as a significant hindrence to the access port 18. The security plate 26 can also be of another material, such as, e.g., polymeric materials like plastic or composite, or ceramic materials. Further, the security plate 26 could slide laterally, or alternatively move in other ways such as sliding vertically, rotating, pivoting, or even closing in from multiple directions as separate pieces. Even further, the shape of the security plate 26 can vary from the straight rectangular shape, to a square, triangle, pentagon, octagon, etc., in planar, and non-planar variations.

FIG. 2 illustrates one application of the present invention where multiple components 30 mount within a component rack 12. These components 30 may include a variety of items. For example, each component 30 may be computer-related hardware, a fan, a group of fans, a data storage device, or an electronic device. A tray 14, as illustrated in FIG. 1, supports each of the components 30. The tray 14 shown is merely an example of a relatively standard type of tray utilized in the computer industry. It has four walls and a floor. The side walls include bearings that allow the sides to slidingly extend and retract. In various locations throughout the tray 14, there are a plurality of mounting edges and apertures for fixing the tray 14 within a structure in various ways. Multiple other variations of trays 14 are possible. Each of the trays 14 anchors to the component rack 12 in a closed position with at least one threaded fastener 28. A cover 10 resides on a front facing side of the tray 14 that is accessible by the user and that allows the user to install and remove trays 14 as desired.

In one embodiment, the cover 10 mounts to the front facing side of the tray 14 with four screws (not shown). The screws are attached through a back side of the front facing side of the tray 14 and are screwed into a backside of the cover 10. Thus, if the tray 14 is in a closed and locked position, there is no access to the screws to unscrew and remove the cover 10. To gain access to the screws, one must be able to pull open the tray 14 and reach around to the back side of the front facing side of the tray 14.

In the embodiment shown in FIG. 2, the cover 10 has the additional feature of being shaped in the form of a handle to assist the user in the extension and retraction of a tray 14. When the user desires to stow the tray 14, the user places his or her hand around the cover and exerts the required force on the cover 10 to retract the tray 14 into a closed position. Alternatively, when the user desires to gain access to the contents of the tray 14, the user grabs on to the handle structure of the cover 10 and pulls the tray 14 outward from the rack 12.

The locking mechanism 16 resides at one end of the cover 10, such that when rotated, the sliding security plate 26 extends over a portion of the tray 14 and the component rack 12, covering the access port 18 to the threaded fastener 28. Thus, a screwdriver cannot be used to remove the threaded fastener 28.

Figure 3:
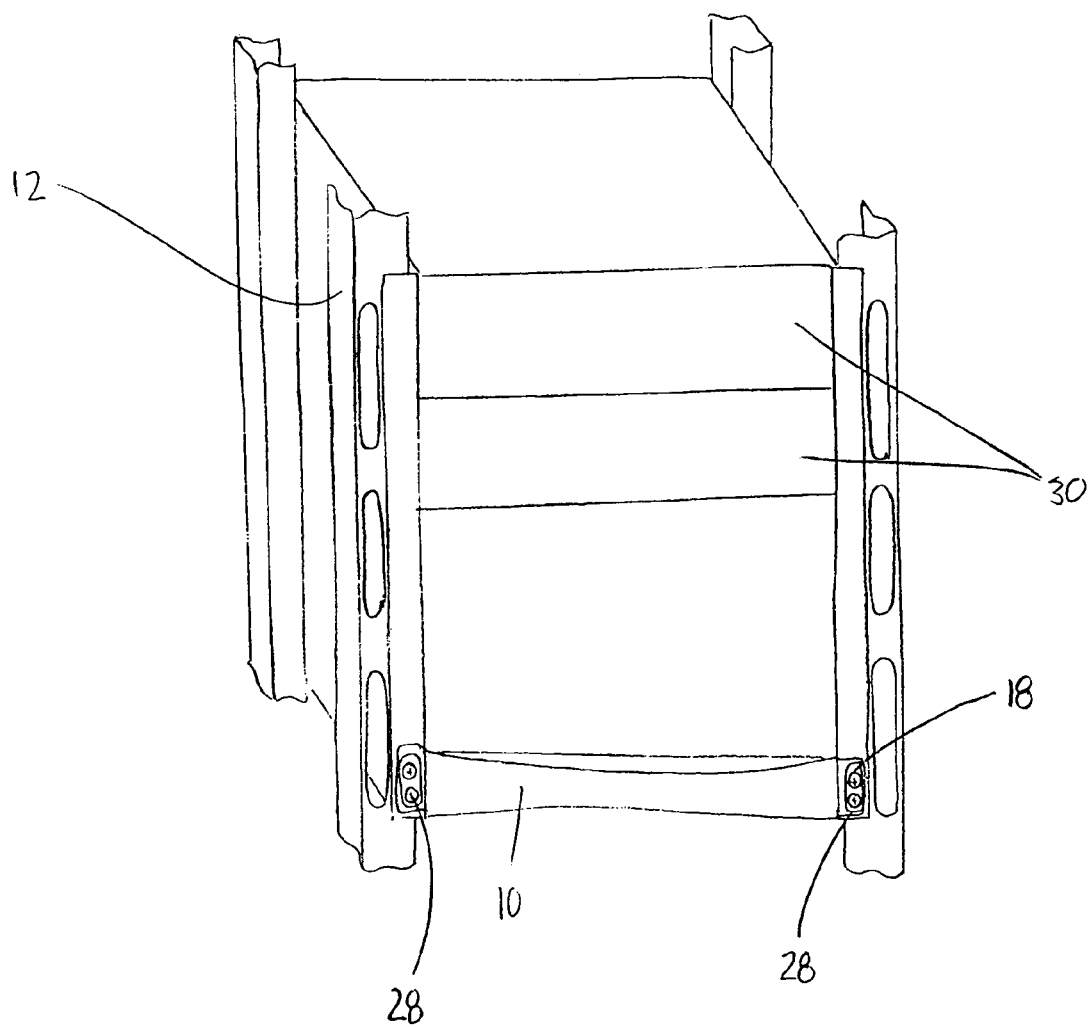
FIG. 3 is a perspective view of a cutout portion of a rack and cover according to another embodiment of the present invention.

The number and type of fasteners employed in practicing the present invention can vary. For example, as illustrated in FIG. 3, there may be multiple threaded fasteners 28 provided to anchor the tray 14 in a closed position. Alternatively, clip-type fasteners, squeeze fasteners, rotate-to-lock fasteners, shaft-and-pin fasteners, and myriad other removable fasteners in any number may be utilized to anchor tray 14 in place as desired, so long as the sliding security plate 26 can extend across the access port 18, blocking access to the fastener as desired.

Figure 4:
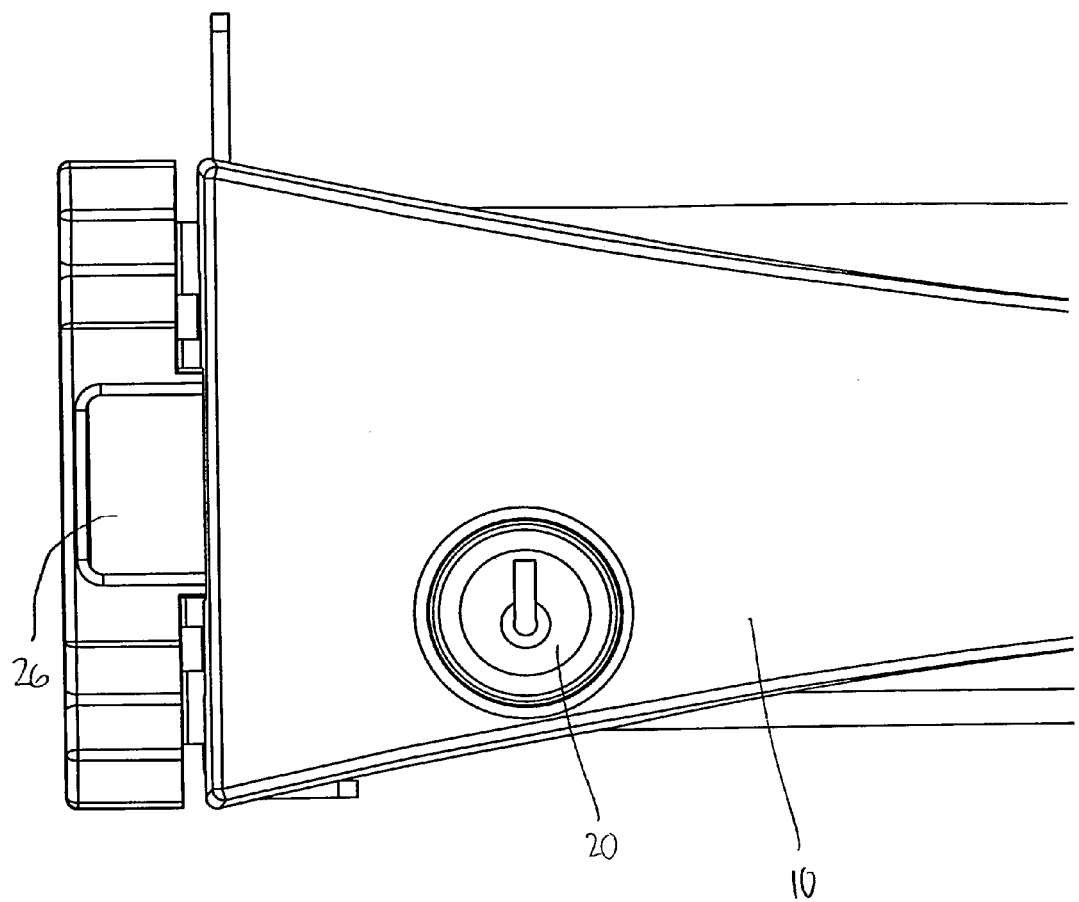
FIG. 4 is a schematic diagram of one end of a cover according to one embodiment of the present invention.
Figure 5:
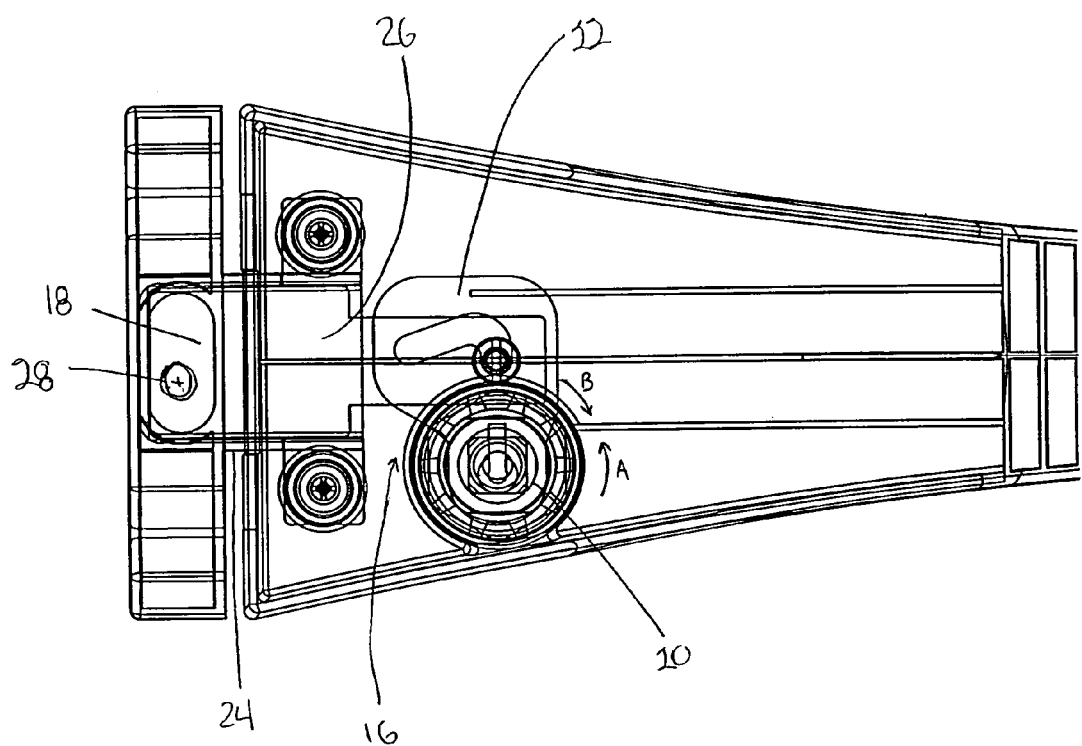
FIG. 5 is a schematic diagram of internal workings at one end of the cover according to one embodiment of the present invention.

FIGS. 4 and 5 illustrate the end of the cover 10 according to one embodiment of the present invention. In this example, the internal components of the locking mechanism function as follows. A user first inserts a key (not shown) into key lock 20. The key lock 20 couples to a pawl 22, which in turn couples to the sliding security plate 26. As the user rotates the key lock 20, the rotational energy translates to the pawl 22 which moves the sliding security plate 26 in a lateral direction depending upon the direction of rotation of the key lock 20. In a first rotational direction (e.g., in the direction of arrow A in FIG. 5), the sliding security plate 26 laterally moves to cover the access port 18. Once in a fully extended ("locked") position, the sliding security plate 26 substantially covers the threaded fastener 28 (or fasteners), inhibiting access to the threaded fastener 28. A track 24 provides the required support for the sliding security plate 26 to sufficiently position and hold the sliding security plate 26 in place. In practice, at such time, the user then removes the key from the key lock 20 leaving the cover 10 and sliding security plate 26 in a closed and locked position. The sliding security plate 26 blocks access to the threaded fastener 28, thus inhibiting a potential infiltrator from removing the threaded fastener 28 and gaining unauthorized access to the tray 14 and components 30.

If the user desires to gain access to the tray 14 and the particular component 30 stored within, the procedure just described is reversed. The user inserts a key into the key lock 20 and rotates the key lock 20 in a second rotational direction (e.g., in the direction of arrow B in FIG. 5). This causes the pawl 22 to retract the sliding security plate 26 until the sliding security plate 26 fully retracts and access to the threaded fastener 28 is once again available through access port 18. At such time, the user then proceeds with the removal of the particular fastener or fasteners 28 anchoring the tray 14 in place, and pulls out the tray 14.

Figure 6:
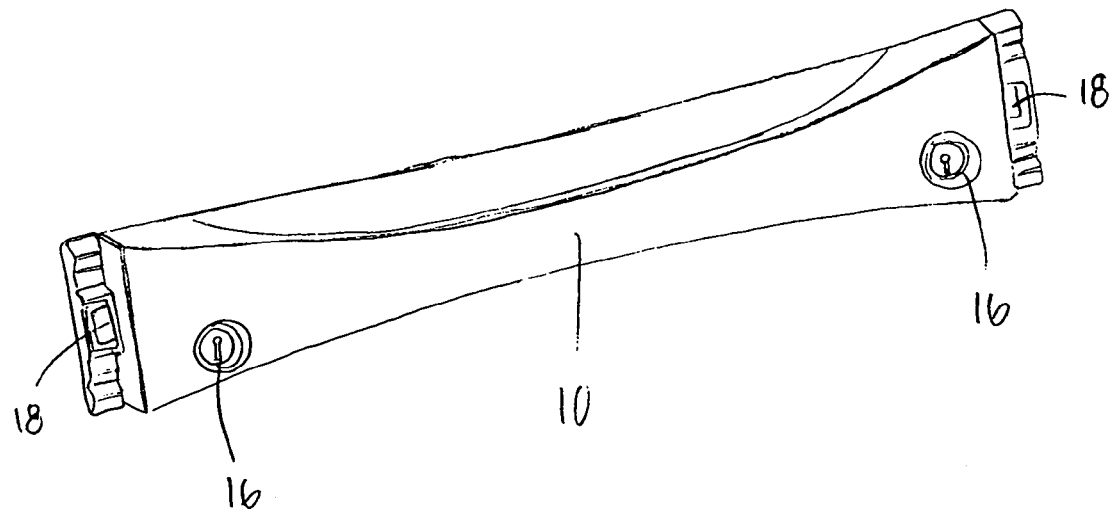
FIG. 6 is a perspective view of additional lock configurations to additional embodiments of the present invention.
Figure 6:
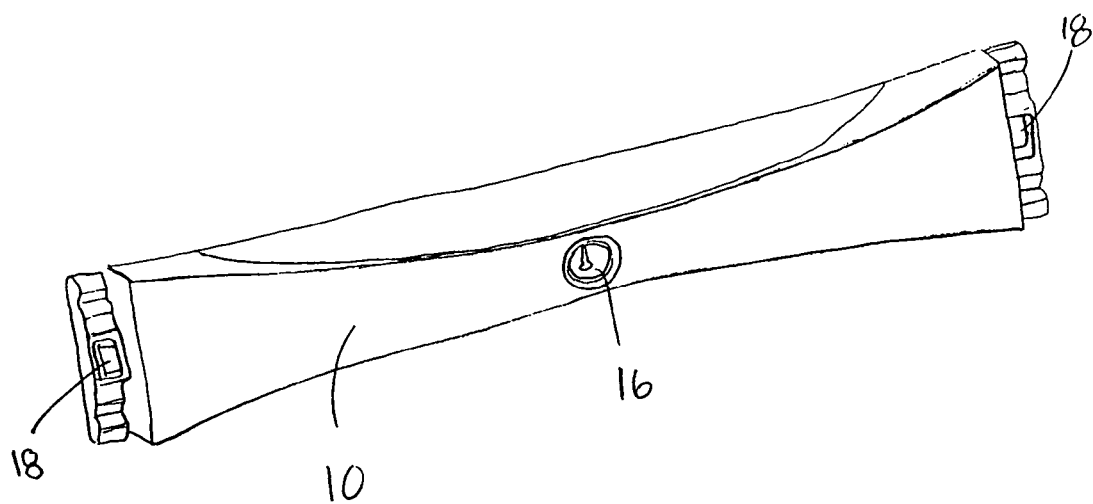
Figure 7:
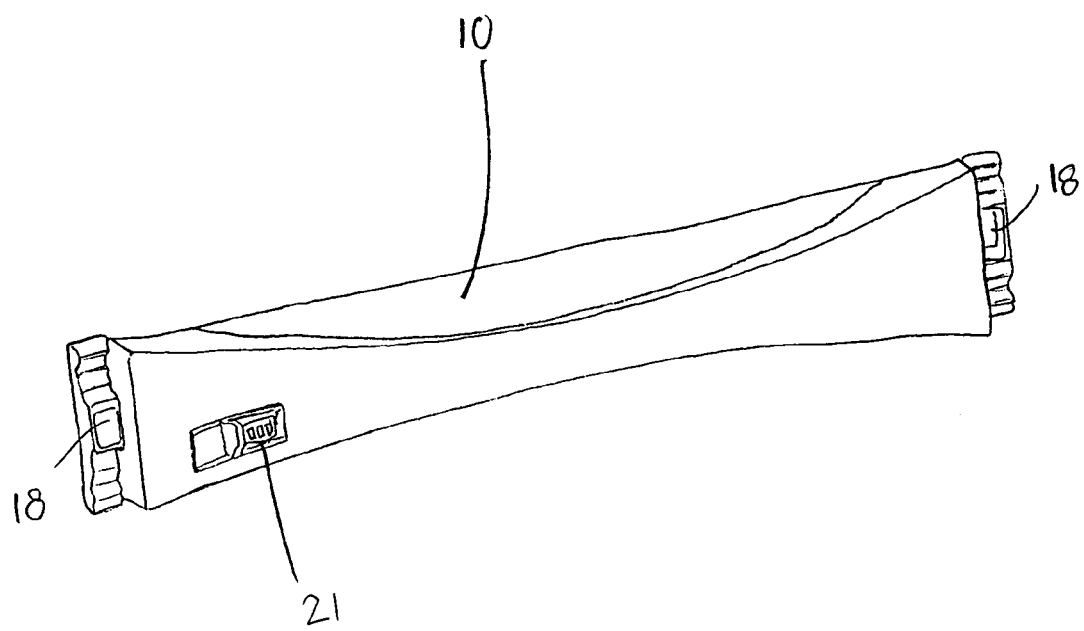
FIG. 7 is yet another perspective view of a lock mechanism and cover according to one embodiment of the present invention.

The position and number of the locking mechanism 16 can also vary. For example, as illustrated in FIG. 6, there may be multiple locking mechanisms 16 located at either end of the cover 10. Alternatively, a single locking mechanism 16 may be positioned in a more central location along the cover 10. In such an instance, the internal lock workings include a pawl 22 that couples to a longer sliding security plate 26 such that the end of the sliding security plate 26 can extend to the access port 18 and cover the threaded fastener 28 as desired. The locking mechanism 16 may also be positioned such that the sliding security plate 26 can extend beyond the fasteners to engage with the component rack 12 and hold the tray 14 in place in addition to blocking access to the fasteners 28.

Further, the type of locking mechanism 16 may also vary. For example, according to FIG. 7, the locking mechanism may be in the form of a combination lock 21. To gain access to the tray 14, the user would first enter in the required combination, then slide the sliding security plate 26 until the access port 18 reveals the particular fastener or fasteners 28. Again, the user would remove the fastener or fasteners 28 and pull out the tray 14.

Figure 8:
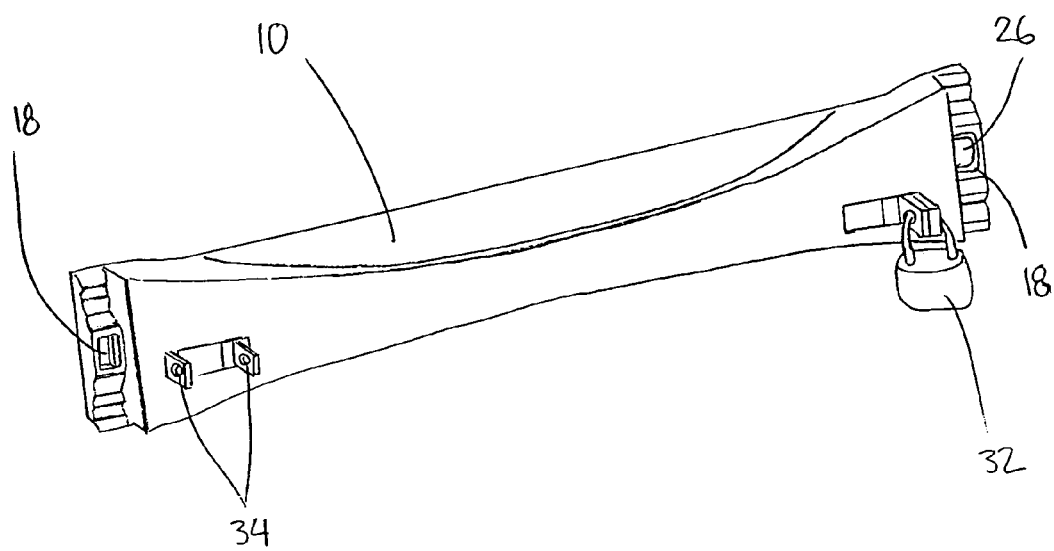
FIG. 8 is still another perspective view of another lock configuration and cover according to an additional embodiment of the present invention.

In still another variation of locking mechanism, FIG. 8 depicts a locking mechanism 16 in the form of a padlock 32. In this figure, on the left side of the cover 10 illustrates the lock mechanism with the padlock removed, while on the right side of the cover 10 the illustration shows the padlock 32 locking the sliding security plate 26 in place. One should note that the use of two locking mechanisms, one on either end of the cover 10, while possible, is not a requirement and is merely for illustrative purposes only to show the locked and unlocked positions in a padlock-based mechanism. To gain access to a tray 14 with this form of lock, the user first unlocks and removes the padlock 32. Then the user then slides the security plate 26 by the lock aperture 34 until the access port 18 reveals itself. To lock the cover 10, the user slides the security plate 26 over access port 18, joining the lock holes 34. The user then threads the padlock 32 through the lock apertures 34 and locks the padlock 32, thus locking the cover 10.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A locking cover for a component rack having a component tray secured to the component rack by a fastener, said locking cover comprising:
   at least one lock mechanism mounted within said locking cover, wherein said lock mechanism includes a sliding security plate that extends beyond one end of said locking cover when in a locked position; and
   a track for slidingly supporting the sliding security plate;
   wherein said sliding security plate covers said fastener to prevent access to said fastener and said component tray can be positioned by pulling and pushing said locking cover serving as a handle for pulling and pushing said locking cover.

2. The locking cover according to claim 1, wherein said lock mechanism further comprises a key lock, and a pawl such that when said key lock is rotated toward the locked position, said pawl slides said security plate along said track, covering said fastener of said component tray.

3. The locking cover according to claim 1, wherein said lock mechanism is a combination lock coupled with said sliding security plate.

4. The locking cover according to claim 1, wherein said lock mechanism is a padlock.

5. The locking cover according to claim 1, wherein said lock mechanism is positioned at one end of said locking cover, proximal to said fastener.

6. The locking cover according to claim 1, wherein said lock mechanism is positioned distal from said fastener.

7. The locking cover according to claim 1, wherein said locking cover is made of a plastic material.

8. The locking cover according to claim 1, wherein said sliding security plate is made of a metal material.

9. The locking cover according to claim 1, wherein said sliding security plate is made of a plastic material.

10. A locking system for a component rack, comprising:
    at least one tray slidably mounted within the component rack;
    at least one fastener removably anchoring said at least one tray to said component rack in a retracted position;
    a cover on a portion of said at least one tray, wherein said cover can be utilized to position said at least one tray within said component rack;
    at least one lock mechanism mounted within said cover; and, a sliding security plate that is extendable to block access to said at least one fastener to lock said at least one tray.

11. The system according to claim 10, wherein said at least one tray holds several components.

12. The system according to claim 10, wherein said cover has a plurality of said lock mechanisms mounted within said cover.

13. The system according to claim 10, wherein said at least one lock mechanism is a key-based lock.

14. The system according to claim 10, wherein said at least one lock mechanism is a combination-based lock.

15. The system according to claim 10, wherein said at least one lock mechanism is a padlock-based lock.

16. The system according to claim 10, wherein said cover is made of a plastic material.

17. A locking system for a component rack said component rack including, a tray slidably mounted within said component rack, said tray anchored to said component rack in a closed position by at least one fastener, such that access to said tray requires access to and removal of said at least one fastener, said locking system comprising:
    a cover mounted to said tray, such that said cover can be utilized to position said tray within said component rack;
    a locking mechanism which prevents access through an access port to said at least one fastener while in a locked position, and allows access through said access port to said fastener while in an unlocked position.

18. The locking system according to claim 17, wherein said at least one fastener is a threaded fastener.

19. The locking system according to claim 17, wherein said locking mechanism is comprised of a key lock, a pawl, a track, and a sliding security plate, such that when said key lock is rotated toward said locked position, said pawl slides said security plate along said track, covering said at least one fastener of said tray.

20. The locking system according to claim 17, wherein said locking mechanism is a combination lock.

21. The locking system according to claim 17, wherein said locking mechanism is a padlock.

22. The locking system according to claim 17, wherein said locking mechanism is positioned at one end of said cover, proximal to said at least one fastener.

23. The locking system according to claim 17, wherein said locking mechanism is positioned distal from said at least one fastener, and said locking mechanism includes a sliding security plate that extends to prevent access to said at least one fastener.

24. The locking system according to claim 17, wherein said tray is anchored to said component rack by two threaded fasteners proximal to a first end of said cover.

25. The locking system according to claim 24, wherein said tray is additionally anchored to said component rack by at least one threaded fastener proximal to a second end of said cover.

26. The locking system according to claim 17, wherein said cover is made of a plastic material.

27. The locking system according to claim 23, wherein said sliding security plate is made of a metal material.

28. The locking system according to claim 23, wherein said sliding security plate is made of a plastic material.

29. A method of securing a tray within a component rack, comprising the steps of:
   sliding said tray into a closed position within said component rack;
   providing a cover for said tray, such that said cover can be utilized to position said tray within said component rack;
   sliding a security plate within said cover until said security plate covers and inhibits access to an access aperture leading to at least one fastener anchoring said tray into said component rack; and
   activating a locking mechanism located within said cover of said tray and coupled to said security plate, to lock said security plate in place.

30. The method according to claim 29, wherein the locking mechanism is a key lock and the steps of sliding said security plate, and activating said locking mechanism, are carried out by,
   inserting a key in a key lock;
   rotating said key in a first direction causing the rotation of an internal pawl, which in turn slides said security plate along a track until said security plate covers said access aperture to said at least one fastener for anchoring said tray into said component rack; and
   removing said key activating said locking mechanism.

31. The method according to claim 29, wherein the locking mechanism is a combination lock and the steps of sliding said security plate, and activating said locking mechanism, are carried out by,
   ensuring a valid combination is entered in said combination lock;
   sliding said security plate along a track until said security plate covers said access aperture to said at least one fastener for anchoring said tray into said component rack; and
   entering a combination to lock said combination lock.

* * * * *